United States Patent [19]

Clough

[11] Patent Number: 5,687,771
[45] Date of Patent: Nov. 18, 1997

[54] TEMPORARILY BLOCKING THE BORE OF A PIPE THROUGH WHICH A FLUID FLOWS WITH A FOAMED PLUG REMOVED BY DISSOLVING

[75] Inventor: Peter Spence Clough, Stretford, England

[73] Assignee: British Gas plc, London, England

[21] Appl. No.: 351,130

[22] Filed: Nov. 30, 1994

Related U.S. Application Data

[62] Division of Ser. No. 52,288, Apr. 26, 1993, Pat. No. 5,400,826, which is a continuation of Ser. No. 729,905, Jul. 15, 1991, abandoned, which is a continuation of Ser. No. 635,380, Jan. 3, 1991, abandoned, which is a continuation of Ser. No. 435,051, Nov. 9, 1989, abandoned.

[30] Foreign Application Priority Data

Nov. 10, 1988 [GB] United Kingdom .................. 8826349
Jan. 5, 1989 [GB] United Kingdom .................. 8900205

[51] Int. Cl.⁶ ................................................. F16L 55/12
[52] U.S. Cl. ............................ 138/89; 138/93; 138/97
[58] Field of Search ........................ 138/89, 93, 97, 138/90; 206/219, 568

[56] References Cited

U.S. PATENT DOCUMENTS 4,012,822  3/1977  Vrolyk et la. ..................... 138/89

FOREIGN PATENT DOCUMENTS 0246835  11/1987  European Pat. Off. ............ 206/568
0158419  1/1983   Germany .......................... 138/93
0672394  7/1979   U.S.S.R. ........................... 138/93

*Primary Examiner*—David Scherbel
*Assistant Examiner*—James F. Hook
*Attorney, Agent, or Firm*—Oblon, Spivak, McClelland, Maier & Neustadt, P.C.

[57] ABSTRACT

A kit is provided for temporarily blocking the bore of a pipe through which a fluid flows, the kit comprising an expansible flexible bag seal which is inserted through a hole provided in the wall of the pipe and an apparatus for injecting into the bag seal a quantity of a material adapted to expand in situ in the bag seal and inflate the bag seal to seal against the inside of the pipe. The pipe may be a gas main and the material may be an expandable synthetic resin foam. The bag seal is removed by injecting thereinto a substance capable of dissolving the foam so that the bag seal can be at least partially deflated.

1 Claim, 1 Drawing Sheet

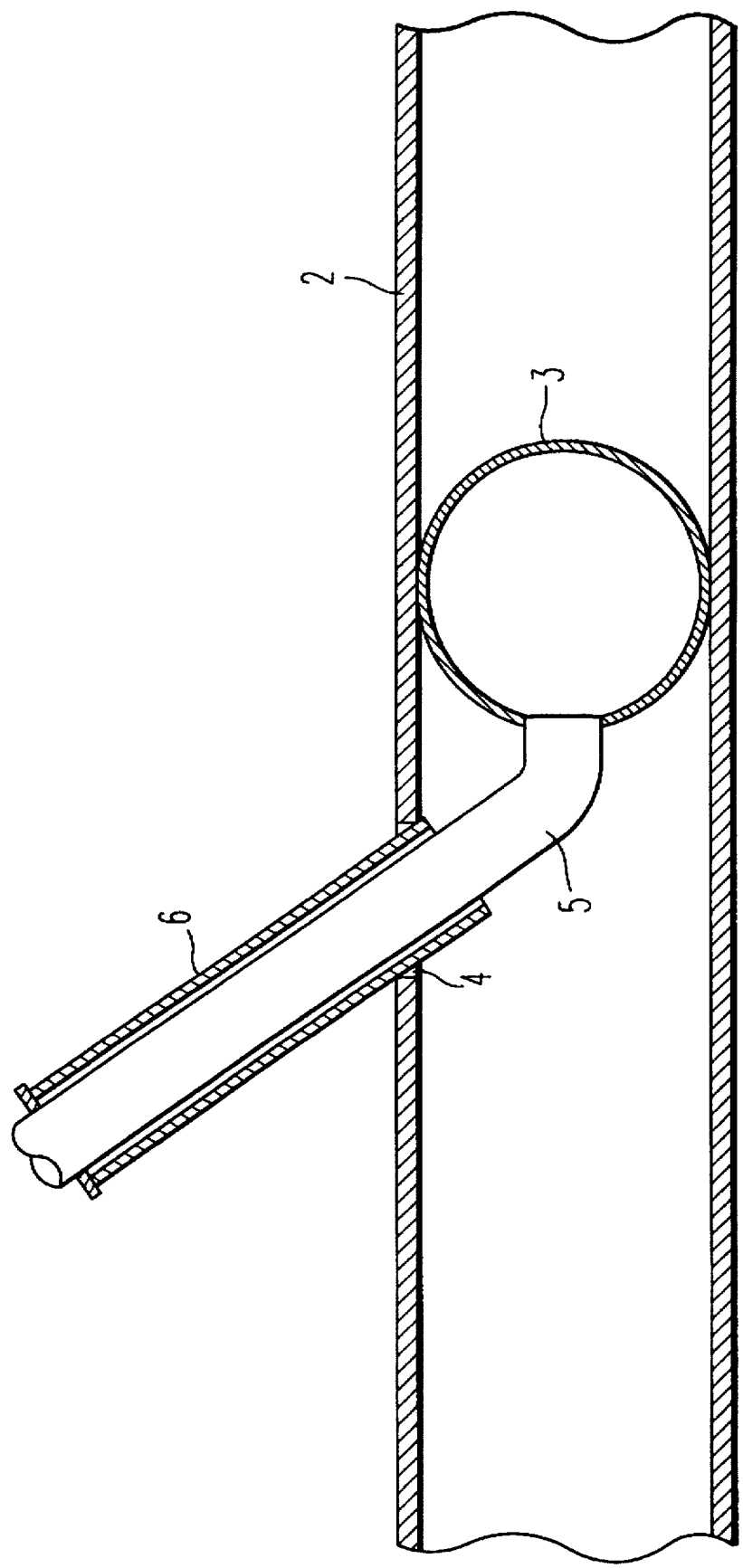

TEMPORARILY BLOCKING THE BORE OF A PIPE THROUGH WHICH A FLUID FLOWS WITH A FOAMED PLUG REMOVED BY DISSOLVING

This is a division of application Ser. No. 08/052,288 filed on Apr. 26, 1993 U.S. Pat. No. 5,400,826, which is a continuation of application Ser. No. 07/729,905 filed on Jul. 15, 1991 now abandoned which is a continuation of application Ser. No. 07/635,380 filed on Jan. 3, 1991 now abandoned which is a continuation of application Ser. No. 07/435,051 filed on Nov. 9, 1989 now abandoned.

BACKGROUND OF THE INVENTION

The present invention relates to the temporary blocking of the bore in a pipe through which a fluid flows and is particularly directed to the temporary blocking of mains carrying natural gas.

Where repairs to a section of a gas main are to be carried out or where a section of the main is to be partially or completely replaced it is frequently necessary temporarily to block the bore or main at a point or points upstream of the section. This prevents the flow of gas to the section of the main dowstream of the blockage so that the necessary work can be carried out.

At present such temporary blockage is performed with the aid of an expansible bag of the type having an innermost inflatable bladder usually of rubber contained with an outermost protective bag of nylon or some such similar material. In use of such bags, a hole is drilled in the wall of the main and the bag is inserted into the main by way of an insertion device in the form of a sealable tube which is temporarily securable in the hole so drilled. Once inside the main the inner bladder is inflated by a supply of pressurised gas eg. compressed air, byway of a pipe connected to the mouth of the bag, the pipe also providing means for locating the bag inside the main through the insertion tube which forms a gas-tight seal around the pipe.

Inflation of the bladder causes it to expand and force the outer bag to engage with the inner wall of the main to form a seal against the wall of the main.

The bag is removed by deflating the bladder and then withdrawing the pipe from the main via the hole and the insertion tube.

Unfortunately the outer protective bag and even the inner bladder are frequently ripped or torn as they are withdrawn from the main. This renders the bag totally unserviceable and it is not an uncommon occurrence that such bags are irreparably damaged after just one operation. Since these bags are relatively expensive, the overall cost of the repairs or replacement operations is increased owing to the wastage of such bags.

SUMMARY OF THE INVENTION

It is an object of the present invention to provide means whereby this overall cost may be reduced.

According therefore to one aspect of the present invention a kit is provided for temporarily blocking the bore of a pipe through which a fluid flows, the kit comprising an expansible flexible bag seal for insertion through a hole provided in the wall of the pipe and means for injecting into the bag seal a quantity of a material which is adapted to expand in situ in the bag seal and inflate the bag seal to seal against the inside of the pipe.

The kit will preferably also include means for injecting into the bag seal after inflation a quantity of a substance capable of dissolving the material within the bag seal so that the bag seal can be at least partially deflated by dissolution of the material to enable the bag seal to be removed from the pipe by way of the hole after use.

According to another aspect of the present invention a method is provided for temporarily blocking the bore of a pipe through which a fluid flows, the method comprising inserting an expansible flexible bag seal through a hole provided in the wall of the pipe and injecting into the bag seal a quantity of a material which is adapted to expand in situ in the bag seal and inflate the bag seal to seal against the inside of the pipe.

The material may be in the form of a preformed expandable synthetic resin foam.

Alternatively the material may comprise components for mixing within the bag seal to form the expandable foam.

Preferably a quantity of a substance capable of dissolving the material within the bag seal is injected into the bag seal after inflation to dissolve the material within the bag seal so that the bag seal can be at least partially deflated by dissolution of the material to enable the bag seal to be removed from the pipe by way of the hole. A suitable solvent for this purpose is acetone.

The bag seal can comprise a single bag rather than a double-bag. The bag may be of a relatively cheap material such as polythene.

Since the bag seal itself, the foam and solvent can be of relatively cheap materials the components are disposable and the system provides a cheap disposable means for temporarily blocking the bore of a gas main.

BRIEF DESCRIPTION OF THE DRAWINGS

The sole FIGURE shows an expanded bag according to the invention within a pipe.

DETAILED DESCRIPTION OF THE PREFERRED EMBODIMENT

The bag 3 of for example polythene can, as is conventional, be inserted into the main 2 by way of a sealable insertion tube 6 whose end is temporarily located in a hole 4 drilled in the wall of the main. The mouth of the bag is first secured to the end of a supply conduit or pipe 5 before insertion and the bag is inserted in the main by pushing the pipe through the tube into the main, the tube 6 forming a gas-tight seal around the pipe. A suitable quantity of preformed expandable foam produced by mixing together CDN 15A and CDN 15B is then injected into the bag by way of the pipe 5. The foam is allowed to expand and inflate the bag to form a seal against the inner wall of the main.

To remove the bag a suitable quantity of a substance capable of dissolving the foam is injected into the bag 3 by way of the pipe 5. A suitable substance is acetone and this is allowed to dissolve the foam so that the bag is at least partially deflated. The pipe 5 is then withdrawn through the tube 5 to remove the bag from the main. Since the bag, the foam and solvent are disposable it does not matter whether the bag is damaged since it will not be reused.

I claim:

1. A kit for temporarily blocking the bore of a pipe through which a fluid flows, comprising:

an insertion tube forming a gas tight seal at a hole in the wall of a pipe when an end of the insertion tube is temporarily located in the hole;

a single flexible bag having a mouth securable to an end of a supply conduit and insertable, with the supply conduit secured thereto, into the bore of the pipe through the insertion tube located at the hole;

a quantity of materials which will form a foam when mixed, for injection into the bag via the supply conduit so as to inflate the flexible bag to form a seal of the flexible bag directly blocking the bore of the main;

means for injecting the quantity of materials into the bag via the supply conduit;

a quantity of a substance capable of dissolving the foam to such an extent that the bag may be at least partially deflated and removed from the pipe; and means for injecting through the insertion tube and into the bag, after inflating the bag with the foam, the quantity of the substance capable of dissolving the foam.

* * * * *